P. F. WILLIS.
OXYACETYLENE CUTTING TORCH.
APPLICATION FILED JULY 23, 1914.
1,119,917.
Patented Dec. 8, 1914.
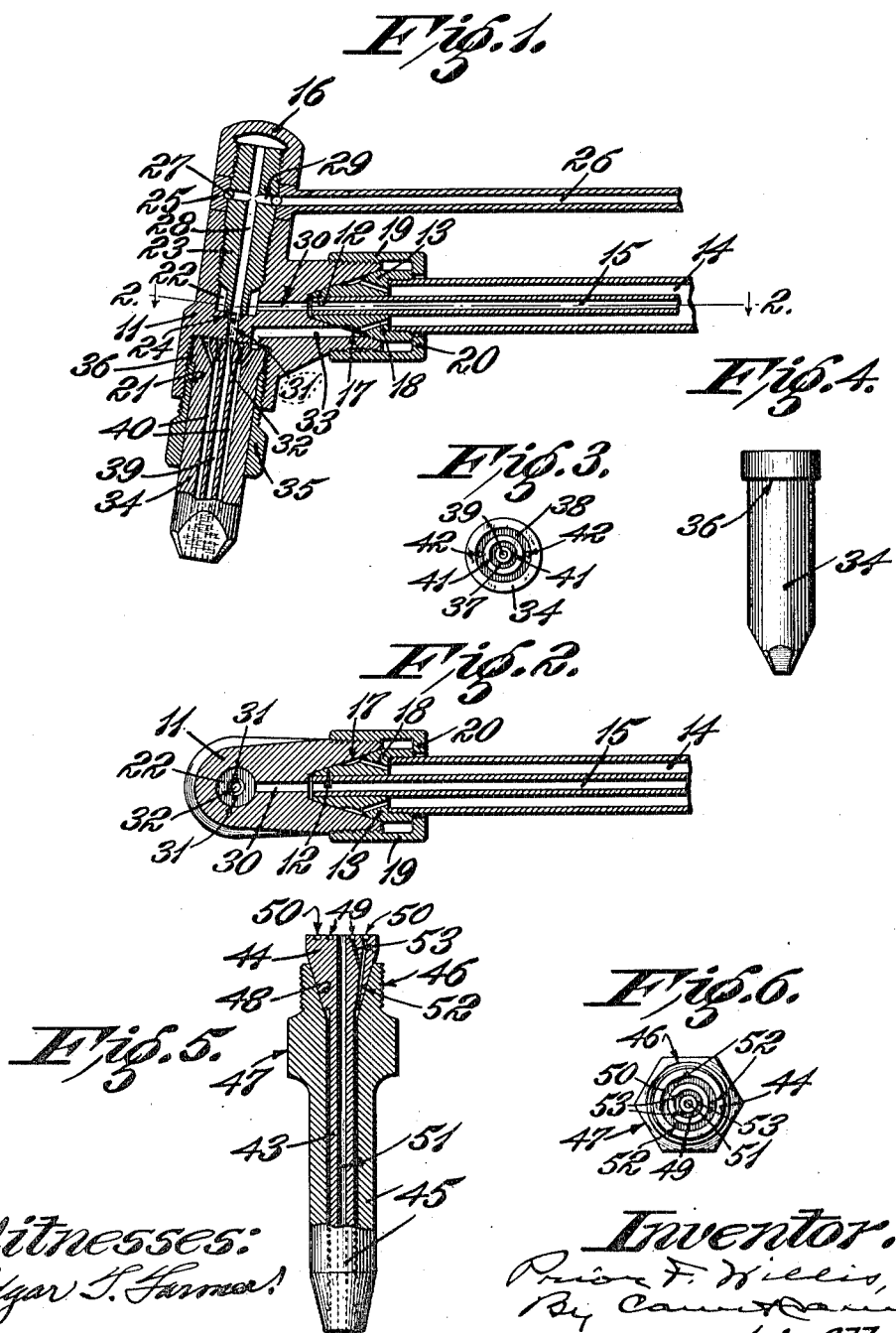

UNITED STATES PATENT OFFICE.

PRIOR F. WILLIS, OF ST. LOUIS, MISSOURI.

OXYACETYLENE CUTTING-TORCH.

1,119,917. Specification of Letters Patent. Patented Dec. 8, 1914.

Application filed July 23, 1914. Serial No. 852,752.

*To all whom it may concern:*

Be it known that I, PRIOR F. WILLIS, a citizen of the United States, and a resident of the city of St. Louis and State of Missouri, have invented a new and useful Improvement in Oxyacetylene Cutting-Torches, of which the following is a specification.

This invention relates to cutting metal by means of an oxidizing flame, and consists in a torch for producing such a flame from oxygen and acetylene gases, or other combustible gases, under pressure.

The object of the invention is an oxyacetylene cutting torch having a tip provided with separate passages for oxygen gas and for a combustible mixture of oxygen and acetylene.

Further objects of the invention appear in connection with the following description of the constructions shown in the accompanying drawings, which illustrate two forms of the invention.

In the drawings, in which the same reference characters designate similar parts in the several views, Figure 1 is a cross-section of the head, tip and part of the handle of a cutting torch, the section being taken on the principal axis of the device, and the outer end of the tip being shown in side elevation; Fig. 2 is a cross-section of the same on the line 2—2 in Fig. 1; Fig. 3 is a view of the inner end, and Fig. 4 is a side view of the tip; Fig. 5 is a part axial cross-section and part side view of a modified form of tip; and Fig. 6 is a view of the inner end of the tip shown in Fig. 5.

Referring to Figs. 1 to 4, inclusive, the torch consists of a T-shaped head 11 having a conical socket 12 in its stem to receive the conical end 13 of the handle connection. The handle connection consists of an outer acetylene pipe 14 and an inner oxygen pipe 15, which are concentrically arranged and which are connected to the acetylene supply and to the oxygen supply, respectively. The conical end 13 has an axial bore through it for the oxygen pipe 15 and a circumferential groove 17 which is connected by passages 18 with the acetylene pipe 14. A sleeve nut 19 screws on the stem of the head and is provided with an annular flange 20 which projects inward at its outer end and engages with an external shoulder on the end of the handle connection, whereby the latter is retained in the socket 12.

One branch of the head has a socket 21 for the tip, and the other branch of the head has a socket 22, in alinement with the socket 21. A plug 23 screws into the socket 22, the inner end of the plug being smaller than the socket and provided with a conical end 24 which is seated in a conical depression in the bottom of the socket. The outer end of the plug 23 projects from the socket 22 and carries a ring 25, which is attached to the end of an oxygen supply pipe 26. The ring is grooved around its interior, and the plug has a groove registering with the groove in the ring, whereby an annular chamber 27 is formed between the plug and ring in communication with the oxygen supply pipe 26. The plug has an axial hole 28 through it from end to end, and passages 29 through the wall of the plug connect the annular chamber 27 and axial hole 28. A cap nut 16 covers the outer end of the plug 23 and is screwed tight against the ring 25 to close the joints between the nut and ring and head.

A passage 30 connects the inner end of the conical socket 12 with the annular chamber surrounding the inner end of the plug 23 at the bottom of the socket 22. Small passages 31 connect this chamber with the socket 21, the passages being symmetrically arranged upon each side of the axis of the head. A middle hole 32 through the head in alinement with the axial hole 28 in the plug connects the conical depression in the bottom of the socket 22 with the socket 21. A side passage 33 connects the socket 12 with the socket 21. One end of the side passage 33 registers with the groove 17 in the conical end of the handle connection, and the other end emerges in the socket 21 at a greater distance from the center than the symmetrical passages 31. The inner end of the socket 21 is flat.

The tip 34 is flat on its inner end, and is held against the flat face of the socket 21 by a ring nut 35 which screws into the socket and bears against a shoulder 36 around the inner end of the tip. The flat inner end face of the tip is provided with two concentric annular grooves. The inner groove 37 registers with the ends of the passages 31, and the outer groove 38 registers with the end of the side passage 33. The tip has an axial passage 39 through it in alinement with the passages 28 and 32 in the plug and head. The tip also has two passages 40, one on each side of the axial passage 39, extending from its outer end nearly to its inner end face. Small passages 41 connect the inner groove 37 in the end face of the tip with each of the passages 40, and small passages 42 connect the outer groove 38 with each of the passages 40, the passages 41 and 42 emerging in the passages 40 in proximity and at an angle to each other. The relative sizes of the passages 41 and 42 are such as to pass a suitable amount of oxygen and acetylene, respectively, to produce a combustible mixture in the passages 40.

In the operation of the torch, oxygen and acetylene gases are supplied to the pipes 15 and 14 through suitable valved connections, the valves being adapted to make the pressure of the oxygen about equal to that of the acetylene. Oxygen gas at a considerably higher pressure is supplied to the pipe 26 through a suitable valved supply pipe, and issues in a jet through the passage 39 in the tip. The torch may be connected with the sources of supply of the oxygen and acetylene through flexible hose or other suitable connections. The combustible mixture of oxygen and acetylene is ignited at the outer ends of the passages 40, which are on opposite sides of the high pressure oxygen passage 39. The heating flame thus produced is brought into contact with the metal to be cut and the latter is heated thereby. When the metal reaches the temperature at which it oxidizes, the central stream of oxygen burns through the metal in its path, and if the torch is moved in either direction along the line connecting the outlets of the two passages 40, the metal will be successively heated and cut through. The tip can be rotatably adjusted in the head to position the passages 40 so as to line up in any direction desired for convenience in cutting.

The tip 34 is particularly adapted for making straight cuts. The modified form of tip shown in Figs. 5 and 6 is adapted for making irregular cuts. The tip shown in Figs. 5 and 6 comprises two parts concentrically arranged. The inner part 43 is a tube having a head 44 at its inner end adapted to seat against the flat inner face of the socket 21 of the head. The outer part 45 is a shell having screw threads 46 at its inner end to screw into the threaded socket 21, and a hexagon 47 intermediate its ends for turning it. The inside diameter of the shell 45 is slightly greater than the outside diameter of the inner member 43, whereby an annular passage is formed between the two parts. The head 44 is conical, widening out toward the end face of the tip, and seated in a conical counterbore 48 in the inner end of the shell 45. The inner end face of the tip is provided with two concentric annular grooves, the inner groove 49 registering with the holes 31 in the head, and the outer groove 50 registering with the side passage 33 in the head. An axial passage 51 extends from end to end of the inner member. Symmetrically arranged passages 52 connect with the outer annular groove 50 and open into the annular space between the two members of the tip at its inner end. Passages 53, corresponding in number and arrangement to the passages 52, connect the inner groove 49 with the passages 52 intermediate their ends. The passages 52 and 53 correspond to the passages 42 and 41 of the tip shown in Figs. 1 to 4, and admit acetylene and oxygen, respectively, to the annular space between the two parts of the tip shown in Figs. 5 and 6. The central passage 51 conducts high pressure oxygen to the outer end of the tip. The shape of the flame produced by the tip shown in Figs. 5 and 6 is circular, with a jet of oxygen in its middle, and consequently the torch can be moved to cut in any direction as the metal is heated all around the oxygen jet.

No claim is made in this application for the forms and arrangements of parts shown, described and claimed in my pending application, Serial No. 852,751 filed July 23, 1914.

I claim the following as my invention.

1. A detachable head member for a torch, said head member comprising a socket for receiving a pipe connection, and detachable means for retaining said pipe connection in said socket, said head also having a tubular projection at an angle to said socket, said projection having a seat on its periphery, a ring having bearing surfaces on its opposite sides and a passage connecting its interior to a pipe, and means detachably arranged on the end of said projection for retaining said ring on said seat.

2. A detachable head member for a torch, said head member comprising a socket for receiving a pipe connection, and detachable means for retaining said pipe connection in said socket, said head also having a tubular projection at an angle to said socket, said projection having a circumferential groove, a ring having parallel sides, a seat for one side of said ring adjacent to said groove, and a cap nut covering the end of said projection and having a bearing on its inner face conforming to the other side of said ring for retaining said ring on said seat.

3. A detachable head member for a torch, said head member having a socket for a tip and a chamber provided with a closure and having an inner end wall and a central passage connecting it with said socket, means for supplying gas to said chamber, said closure comprising a tubular portion projecting into said chamber in longitudinal alinement with said central passage, said tubular portion having its inner extremity of less diameter than the width of said chamber and seated against the inner end wall of said chamber whereby it is in communication with said passage, a passage in said closure leading to said tubular portion for supplying gas thereto, and passages connecting said socket with said chamber and emerging in the annular space surrounding the inner end of said tubular portion of the closure.

4. A torch head having a socket, a chamber, a central passage connecting said socket with said chamber, means for supplying gas to said chamber, a plug in said chamber, a longitudinal passage through said plug, said plug at one end of said longitudinal passage being seated against that portion of the wall of said chamber surrounding said central passage whereby communication is established between said central and longitudinal passages, said plug having its inner end of less diameter than said chamber to provide an annular space, and passages in the head connecting said socket with the annular space.

5. A T-shaped head member for a torch, said head member comprising a stem and two oppositely disposed branches, one of said branches having a socket for a tip and the other branch having a seat for a pipe connection, a central passage connecting said socket and said seat, said stem having a socket for a pipe connection, and a plurality of passages connecting said sockets in the stem and branch, respectively, said passages opening into said socket in the branch at different radial distances from its center, respectively, and one of said passages being axially disposed in said stem.

6. A tip for an oxy-acetylene torch, said tip having a flat inner end provided with two concentric annular grooves, an axial hole through said tip, and a side passage on each side of said axial hole and extending through said tip, each of said side passages branching into two diverging passages, respectively, connecting with said two concentric grooves.

7. A tip for an oxy-acetylene torch, said tip having a flat inner end provided with two concentric annular grooves, an axial hole through said tip, and a passage from each of said grooves into said tip, said passages converging intermediate the ends of said tip, and a duct extending from the juncture of said passages to the outer end of the tip.

Signed at St. Louis, Missouri, this 20th day of July, 1914.

PRIOR F. WILLIS.

Witnesses:
A. M. HOLCOMBE,
M. A. SHELTON.